(12) United States Patent
Wan et al.

(10) Patent No.: US 9,369,233 B2
(45) Date of Patent: Jun. 14, 2016

(54) LINK ADAPTATION IN A WIRELESS TELECOMMUNICATIONS SYSTEM

(75) Inventors: Lei Wan, Beijing (CN); Bo Göransson, Sollentuna (SE)

(73) Assignee: Unwired Planet, LLC, Los Altos, CA (US)

( * ) Notice: Subject to any disclaimer, the term of this patent is extended or adjusted under 35 U.S.C. 154(b) by 1937 days.

(21) Appl. No.: 12/521,667

(22) PCT Filed: Dec. 27, 2006

(86) PCT No.: PCT/EP2006/012537
§ 371 (c)(1),
(2), (4) Date: Jul. 3, 2009

(87) PCT Pub. No.: WO2008/077433
PCT Pub. Date: Jul. 3, 2008

(65) Prior Publication Data
US 2010/0323739 A1    Dec. 23, 2010

(51) Int. Cl.
*H04W 72/00* (2009.01)
*H04L 1/00* (2006.01)
*H04W 28/18* (2009.01)

(52) U.S. Cl.
CPC ............. *H04L 1/0026* (2013.01); *H04W 28/18* (2013.01)

(58) Field of Classification Search
CPC ................... H04W 72/0446; H04W 72/0453; H04W 76/023; H04W 72/085; H04W 72/12
USPC ............................... 455/450, 451, 452.1, 101
See application file for complete search history.

(56) References Cited

U.S. PATENT DOCUMENTS

2002/0183066 A1* 12/2002 Pankaj .......................... 455/453
2006/0203891 A1*  9/2006 Sampath et al. .............. 375/132

FOREIGN PATENT DOCUMENTS

EP           1 304 900 A      4/2003

* cited by examiner

*Primary Examiner* — Tu X Nguyen
(74) *Attorney, Agent, or Firm* — Nixon & Vanderhye P.C.

(57) ABSTRACT

The invention relates to control of link resources in a wireless telecommunications system, in which instant channel feedback information is transmitted from a mobile terminal in response to receipt of a selection message from a basestation, and the instant channel feedback information is used for real-time resource allocation and adaptation at the basestation. The feedback information includes channel quality information derived from pilot signals and from pre-allocated transmission weights.

14 Claims, 5 Drawing Sheets

LINK ADAPTATION IN A WIRELESS TELECOMMUNICATIONS SYSTEM

The present invention relates to wireless telecommunications systems, and, in particular, to any telecommunication networks that supports fast link adaptation, e.g. HSPA and 3GPP long-term evolution (LTE)

BACKGROUND OF THE PRESENT INVENTION

Figure 1:
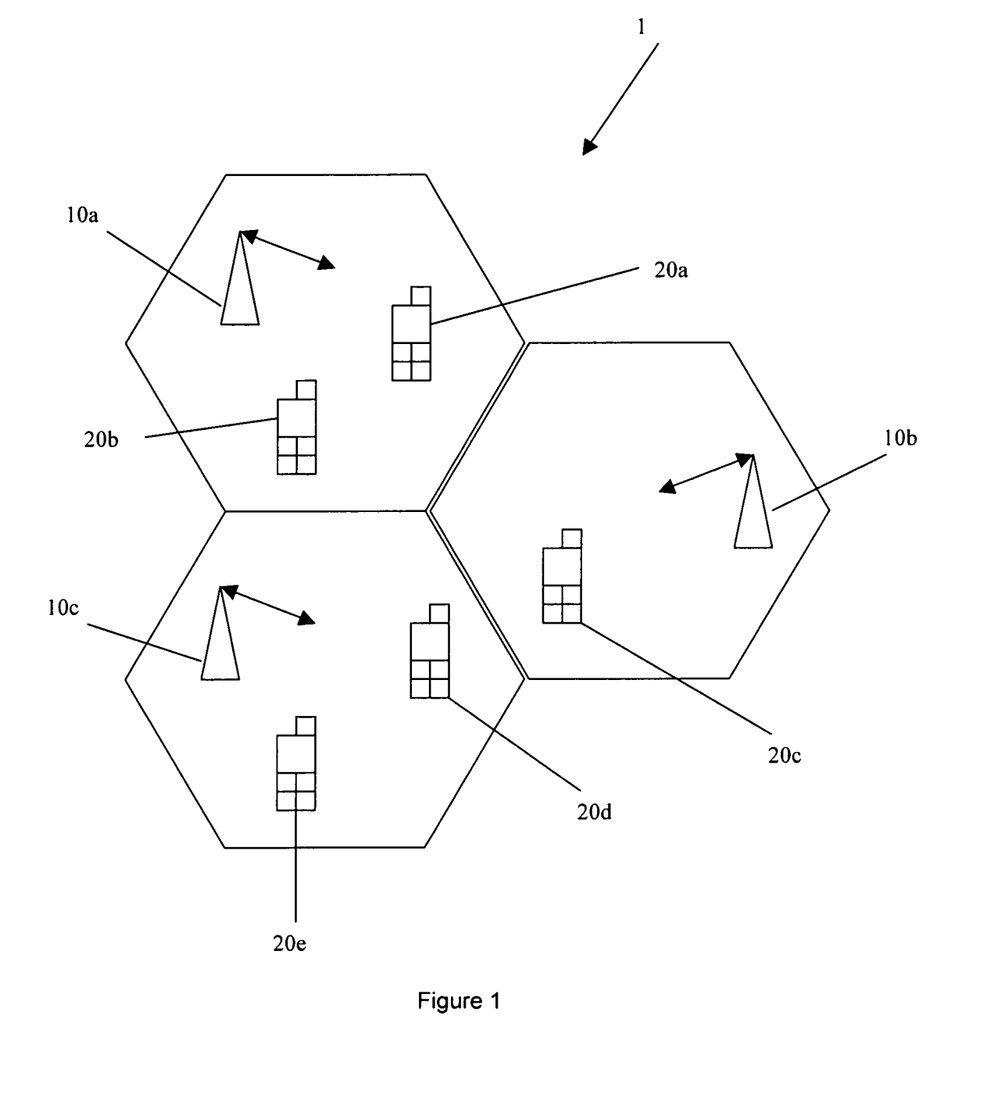
FIG. 1 illustrates a cellular wireless telecommunications system.

An exemplary wireless telecommunications system 1 is illustrated in FIG. 1 of the accompanying drawings, and includes a number of basestations 10a, 10b and 10c, which communicate over a radio frequency (RF) air interface with mobile terminals 20a, 20b, 20c, 20d, and 20e. The mobile terminals are sometimes referred to as "user equipment (UE)". It will be appreciated that the number of basestations and mobile terminals is merely exemplary, and that the systems can include any appropriate number of such units.

In order for communication, that is, data transfer, to be successful between the basestations 10 and the mobile terminals 20, communications channels are allocated to respective mobile terminals. These channels, or "links", can be allocated in the time domain and/or the frequency domain, as is well known. Communications from a basestation 10 to a mobile terminal 20 are known as downlink communications, and communications from the mobile terminal 20 to the basestation 10 are known as uplink communications. The communications channels allocated for such data transfer are known as the downlink (DL) and the uplink (UL) respectively.

In order to increase capacity and coverage, some wireless telecommunications systems make use of link adaptation and scheduling. In order to support such techniques, feedback information, such as channel state information (CSI) or channel quality indicator (CQI) information is required. Such feedback information has to be supplied frequently and accurately so that the allocated communication channels in the system can be maintained at the appropriate quality level. As is known, transmission mode adaptation and link adaptation are terms used in wireless communications to denote the matching of the modulation, coding and other signal and protocol parameters to the conditions on the radio link (for example, the interference due to signals coming from other transmitters, the sensitivity of the receiver, the available transmitter power margin, etc.). The process of link adaptation is a dynamic one and the signal and protocol parameters can change as the radio link conditions change.

For a wideband wireless system that supports a large number of mobile terminals, the bandwidth required for the signalling of CSI/CQI and other feedback information is very high, and represents a very significant burden on the uplink. Although this is true for both time-domain, and for time and frequency domain systems, it is the time and frequency domain system that suffers most, since the total resource is cut to much finer granularity and a higher number of CSI/CQI signals are required due to more small-size sub-units.

3GPP™ Release 5 (Third Generation Partnership Project) introduces the concepts of link adaptation and scheduling in HSDPA (High-Speed Downlink Packet Access) systems. The resource allocation and transport format and resource related information (TFRI) is carried by the High Speed Shared Control Channel (HS-SCCH). The HS-SCCH is two time slots ahead of the data transmission and is carried over the High Speed Downlink Shared Channel (HS-DSCH). Accordingly, scheduling and link adaptation is carried out at the same time, two time slots ahead of the data transmission. Every mobile terminal in the system performs channel quality reporting at regular intervals, so that such signalling is transmitted for each channel in the system on a continual basis.

In addition, it can be very difficult to support accurate feedback for systems using transmitter only precoding. Ideally CQI feedback (to support fast link adaptation) and the preferred transmit weights (on which to base the channel matrix and the covariance matrix of interference and noise), or the channel matrix and covariance matrix themselves, are required for accurate link adaptation.

It will, therefore, be appreciated that use of link adaptation and scheduling in wideband wireless telecommunications systems is desirable in order to increase capacity of the systems, but has the significant problem that channel quality reporting by the mobile terminals uses an undesirably high proportion of the available uplink bandwidth. It will also be readily appreciated that providing a technique whereby high quality feedback information can be supplied in advance of link adaptation is desirable.

SUMMARY OF THE PRESENT INVENTION

Embodiments of the present invention provide techniques for reducing the amount of feedback information signalling required for scheduling and transmission mode adaptation in a wireless telecommunications system. Such reduction is achieved by selecting only a subset of all the mobile terminals that communicate with a basestation for scheduling, link adaptation and other transmission mode adaptation at one time.

According to one aspect of the present invention, there is provided a method of controlling link resources in a wireless telecommunications system, the link resources being provided by a basestation of the system for enabling communication from the basestation to a plurality of mobile terminals, the method comprising:

selecting a subset of mobile terminals from the plurality of mobile terminals communicating with the basestation;

pre-allocating link resources to the mobile terminals in the selected subset of mobile terminals;

determining transmission weights for each of the mobile terminals in the subset of mobile terminals;

sending respective selection messages to the mobile terminals in the subset of mobile terminals, each selection message including pre-allocation information for the mobile terminal concerned, and being transmitted in the form of a dedicated pilot signal using the determined transmission weights for the mobile terminal concerned;

obtaining feedback information from the mobile terminals in the selected subset, such feedback information being supplied in response to reception of a selection message, the feedback information including channel interference information;

performing transmission mode adaptation for the mobile terminals in the selected subset in dependence upon the obtained feedback information.

According to another aspect of the present invention, there is provided a method of receiving data at a mobile terminal of a wireless telecommunications system from a basestation, the method comprising:

receiving a selection message from a basestation, the selection message including channel resource pre-allocation information, and being transmitted in the form of a dedicated pilot signal using transmission weights determined for the mobile terminal;

transmitting feedback information to the basestation in response to receipt of the selection message therefrom, the feedback information including channel interference information; and receiving data from the basestation using pre-allocated resources.

According to another aspect of the present invention, there is provided a basestation for use in a wireless telecommunications system, the basestation comprising:

a controller operable to select a subset of mobile terminals from a plurality of mobile terminals communicating with the basestation;

a resource allocation unit operable to pre-allocate link resources to the mobile terminals in the selected subset of mobile terminals, and to determine transmission weights for each of the mobile terminals in the subset of mobile terminals;

a transmitter, responsive to the resource allocation unit, and operable to send respective selection messages to the mobile terminals in the selected subset of mobile terminals, each selection message including pre-allocation information, and being transmitted in the form of a dedicated pilot signal using respective determined transmission weights for the mobile terminals concerned;

a receiver operable to obtain feedback information from mobile terminals in the selected subset, such feedback information being supplied in response to reception of such selection messages;

a resource allocation unit operable to perform transmission mode adaptation for the mobile terminals in the selected subset in dependence upon obtained feedback information.

According to yet another aspect of the present invention, there is provided a mobile terminal for use in a wireless telecommunications system, the mobile terminal comprising:

a receiver operable to receive a selection message from a basestation, the selection message including pre-allocation information relating to pre-allocated channel resources, and being transmitted from the basestation in the form of a dedicated pilot signal using transmission weights determined for the mobile terminal;

a feedback generation unit operable to generate feedback information utilising received pre-allocation information, and dedicated pilot channel information, the feedback information including channel interference information; and a transmitter to transmit feedback information to a basestation in response to reception of a selection message therefrom, the receiver also being operable to receive data via pre-allocated channel resources.

According to yet another aspect of the present invention, there is provided a basestation for use in a wireless telecommunications system, the basestation comprising:

a receiver operable to receive respective transmission request messages from a plurality of mobile terminals;

a controller operable to select a subset of mobile terminals from the plurality of mobile terminals, and to obtain feedback information relating to the mobile terminals in the selected subset, and to perform transmission mode adaptation for the mobile terminals in the selected subset in dependence upon the obtained feedback information; and a resource allocation unit operable to:

pre-allocate respective link resources to the mobile terminals in the subset of mobile terminals;

determine transmission weight information for each of the mobile terminals in the subset of mobile terminals; and send respective selection messages to the mobile terminals in the subset of mobile terminals, each selection message including pre-allocation information and transmission weight information for the mobile terminal concerned.

According to yet another aspect of the present invention, there is provided a method of controlling uplink resources in a wireless telecommunications system, the uplink resources being provided by a basestation of the system for enabling communication from a plurality of mobile terminals and the basestation, the method comprising:

receiving respective transmission request messages from a plurality of mobile terminals;

selecting a subset of mobile terminals from the plurality of mobile terminals;

pre-allocating respective link resources to the mobile terminals in the subset of mobile terminals;

determining transmission weight information for each of the mobile terminals in the subset of mobile terminals;

sending respective selection messages to the mobile terminals in the subset of mobile terminals, each selection message including pre-allocation information and transmission weight information for the mobile terminal concerned;

obtaining feedback information relating to the mobile terminals in the selected subset, the feedback information including channel interference information;

performing transmission mode adaptation for the mobile terminals in the selected subset in dependence upon the obtained feedback information.

DETAILED DESCRIPTION OF THE PREFERRED EMBODIMENTS

Techniques embodying the present invention are applicable to wireless telecommunications systems such as that illustrated in FIG. 1. As described above, the exemplary system of FIG. 1 includes a number of basestations 10a, 10b and 10c, which communicate over a radio frequency (RF) air interface with mobile terminals 20a, 20b, 20c, 20d, and 20e.

Figure 2:
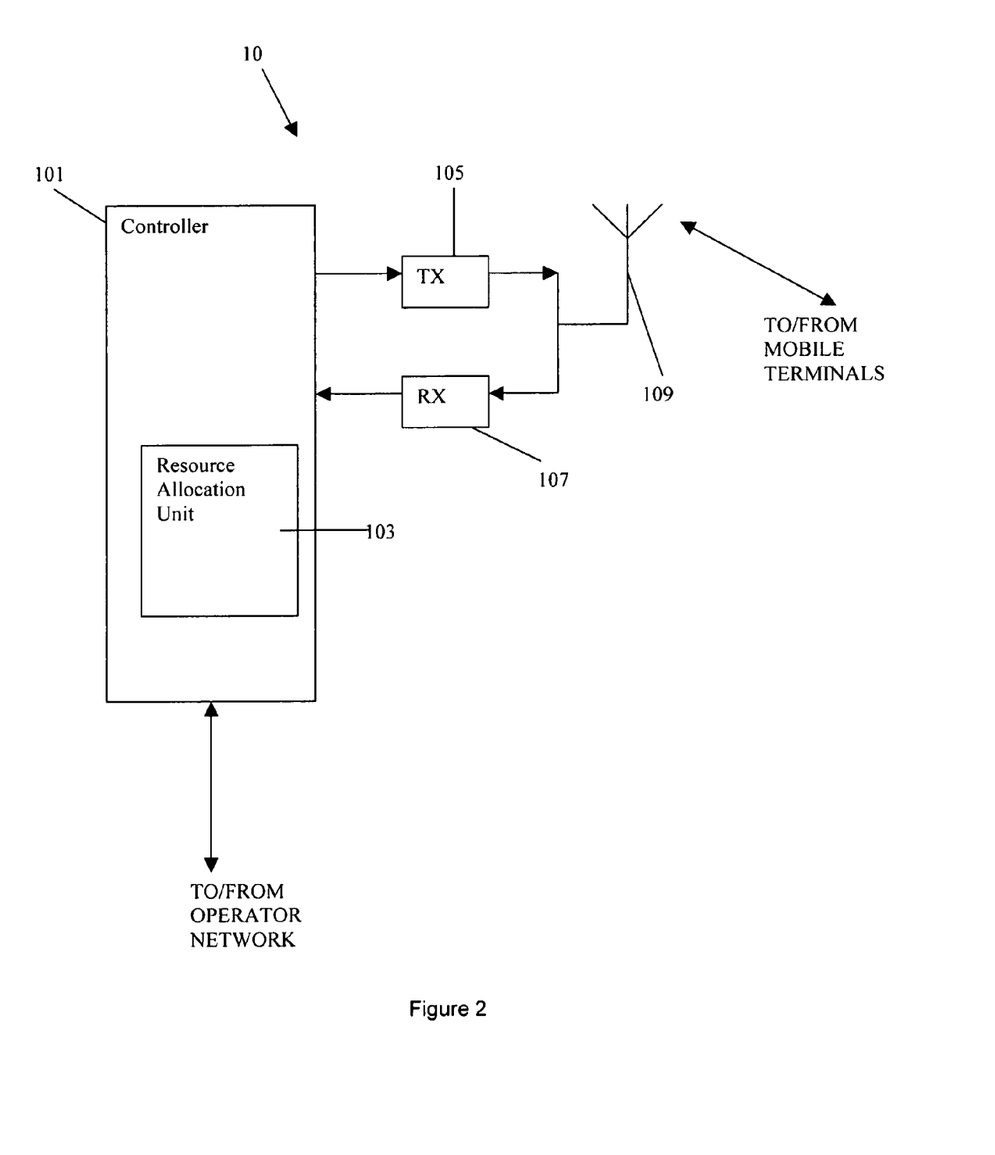
FIG. 2 is a simplified block diagram of a basestation for use in a wireless telecommunications system.

A simplified block diagram of a basestation for use in accordance with techniques embodying the present invention is shown in FIG. 2. The basestation 10 includes a controller 101, which itself includes a resource allocation unit 103. The basestation 10 also includes transmitter (TX) and receiver (RX) circuitry for transmitting and receiving radio frequency signals to and from an antenna 109 respectively. The antenna provides the wireless communication path with the mobile terminals. The controller 101 communicates data with the transmitter 105 and the receiver 107. The controller is also in communication with the operator network (not shown). Operation of the resource allocation unit will be described in detail below. However, it will be readily appreciated that the function of the resource allocation unit could be provided outside of the controller 101 of the basestation 10. For example, the resource allocation unit could be provided centrally in the operator network. The resource allocation unit is shown as part of the basestation for the sake of clarity.

Figure 3:
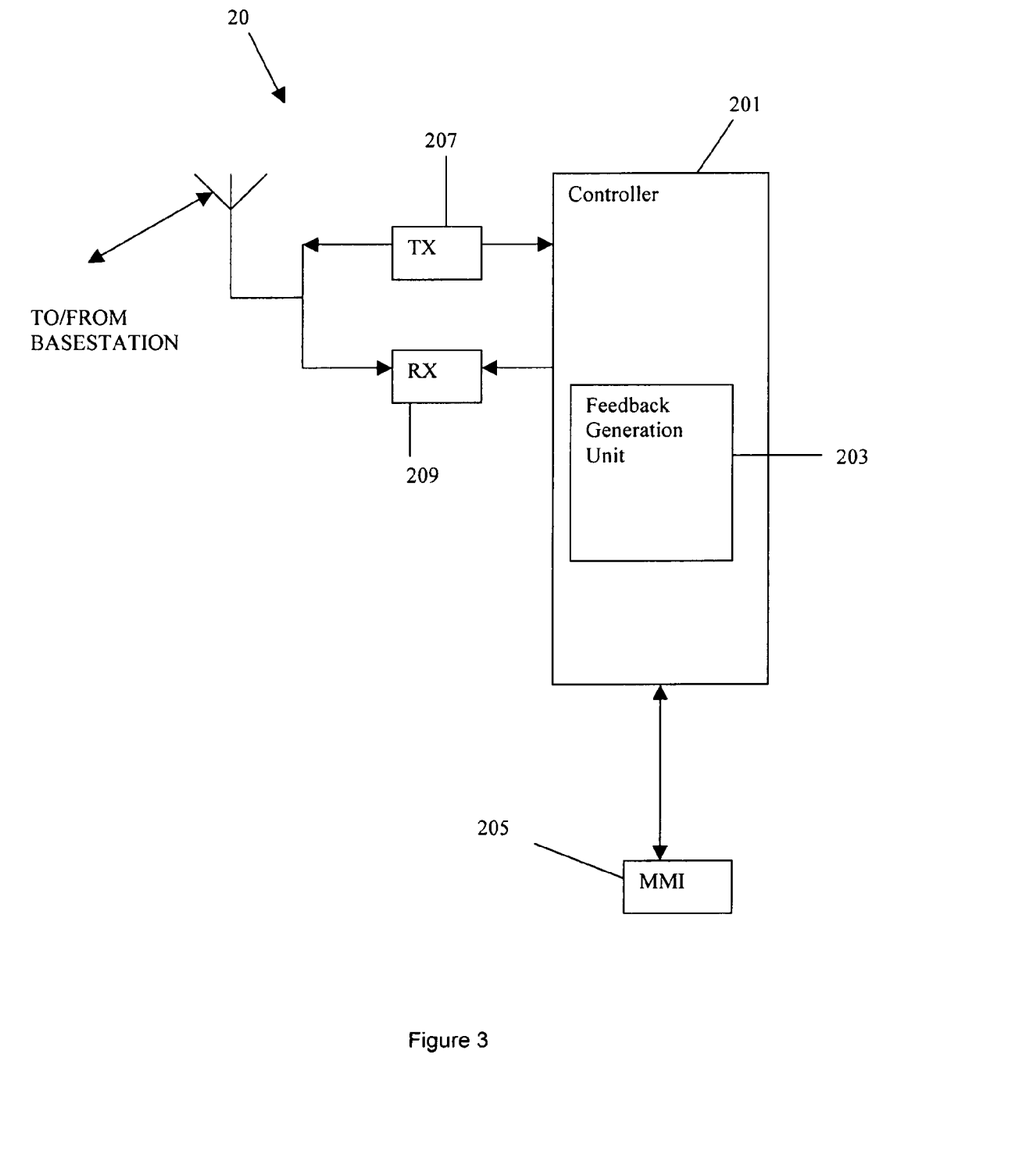
FIG. 3 is a simplified block diagram of a mobile terminal for use in a wireless telecommunications system.

FIG. 3 illustrates a simplified block diagram of a mobile terminal for use in accordance with the techniques embodying the present invention. The mobile terminal 20 includes a controller 201, a man machine interface 205, transmitter and receiver circuitry 207 and 209, and an antenna 211. As is well known and understood, the controller 201 of the mobile terminal 20 controls data communications with a basestation of a wireless telecommunications system via the transmitter 207, the receiver 209 and the antenna 211. A user interacts with the mobile terminal by way of the man machine interface (MMI) 205, which may include such devices as a display screen, a keypad, a microphone, and a loudspeaker.

The controller 201 of the mobile terminal 20 includes a feedback measurement unit 203 which operates to generate feedback information relating to link resources to which the mobile terminal has access. The feedback information can be channel state information (CSI), channel quality indicator (CQI), multi-antenna transmission weights, beam selection indicator or any appropriate measure.

Figure 4:
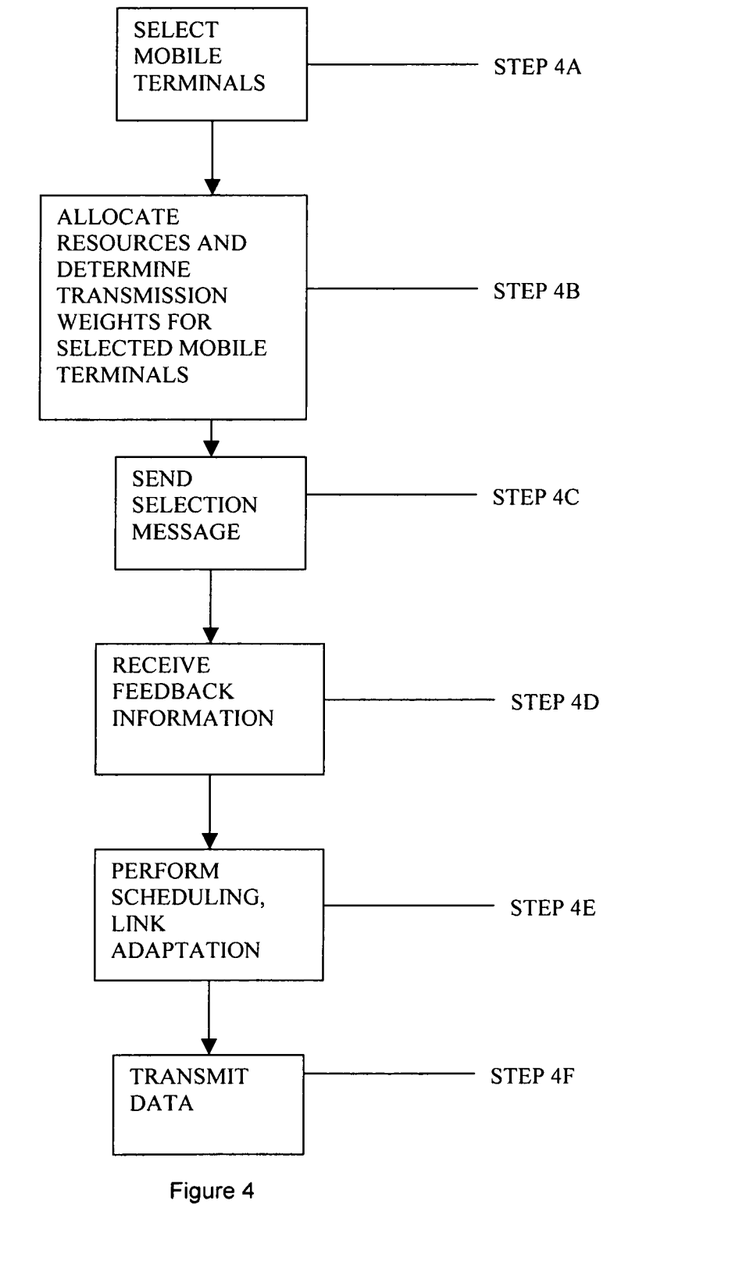
FIG. 4 illustrates steps carried out by a basestation in a method embodying the present invention for use in controlling downlink resources.
Figure 5:
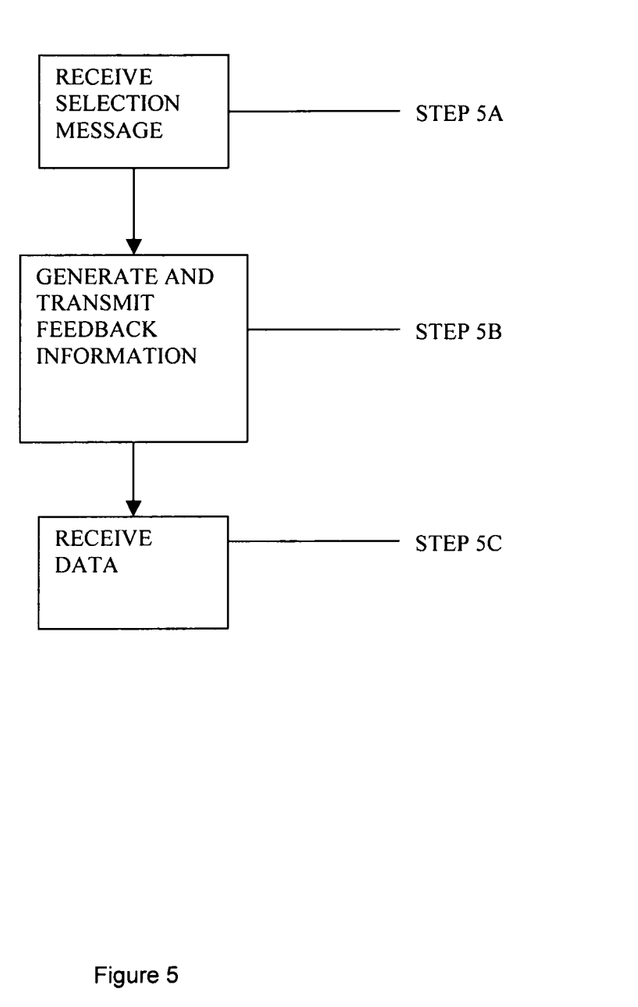
FIG. 5 illustrates steps carried out by a mobile terminal in the method embodying the present invention relating to downlink resources.

A method embodying the present invention, which relates to control of downlink resources, will now be described with reference to the flow charts of FIGS. 4 and 5, as well as to the block diagrams of FIGS. 2 and 3. The method will be described in detail with reference to downlink communications from the basestation 10 to the mobile terminals 20, and will assume that each mobile terminal makes use of a single channel and service. It will be readily appreciated that the techniques can be applied to a multi-channel, multi-service environment.

At step 4A, the resource allocation unit 103 selects a subset of the mobile terminals communicating with the basestation 10. This selection is made so as to reduce the number of mobile terminals requiring scheduling and transmission adaptation at any one time. The mobile terminals are preferably selected from those which are actively waiting in a packet data mode for reception of data packets.

Selection of the subset of mobile terminals can be made by evaluating any appropriate criteria. In a channel dependent scheduling and adaptation scheme, if no channel feedback information is available, then channel independent information can be used to make the selection of the subset of the mobile terminals. For example, packet data unit (PDU) size, discontinuous transmission (DTX) time, block error rate (BLER) requirement, delay requirement, and/or jitter requirement may be used to determine the mobile terminals to be selected as part of the subset. In addition, or alternatively, buffer sizes of the transmitter, the priority of a mobile terminal's service, prediction of a mobile terminal's handover likelihood, and/or data rate requirement may be used in the selection of mobile terminals.

When some feedback information is available, for example a CQI feedback with a long time period, the respective priorities of the mobile terminals are preferably used to determine the selection. The factors mentioned above may also be considered when selecting the mobile terminals.

In the case of channel-independent scheduling, the selected subset of mobile terminals can be determined by random selection using a seed signal broadcasted in the common control channel.

The resource allocation unit 103 may now allocate link resources to each of the selected mobile terminals (step 4B). In time domain systems, this means that respective time slots are allocated to the selected subset of mobile terminals for transmission of data thereto.

In time and frequency domain systems, the time-frequency combinations are divided into time-frequency resource blocks, and respective resource blocks are allocated to each of the mobile terminals in the selected subset of mobile terminals. This block allocation also includes determination of power allocations and/or transmit weights for the selected subset of mobile terminals.

Alternatively, no link resource allocation may be performed at this stage, in which case the method moves directly from step 4A to step 4C

At step 4C, the selected mobile terminals are informed of their selection by the transmission of respective selection messages from the basestation 10 to the mobile terminals 20 concerned via the basestation transmitter 105 and antenna 109. In embodiments of the present invention, the pre-allocation information is transmitted to the mobile terminals in the selected subset using respective dedicated pilot signals that use the respective power allocations and/or transmit weights determined for the mobile terminals concerned. Each selection message can also include information regarding the type of feedback information that is required from the mobile terminal 20. The options for the variations in type of feedback information will be discussed below. A selected mobile terminal 20 receives the selection message (step 5A) via the antenna 211, and the receiver 209, and, in response to its reception, generates and transmits feedback information (step 5B) to the basestation.

Receipt of the selection message by a mobile terminal causes the mobile terminal 20 to transmit feedback information, such as CSI, CQI or beam selection indicator, to the basestation 10. In the case where the resource allocation unit 103 has allocated specific link resources to the mobile station, the feedback information relates to those specific resources. Since the pre-allocation signal is transmitted from the basestation 10 using the determined transmission weights and/or power allocations, the mobile terminals are able to estimate channel interference levels accurately. This then allows the feedback information supplied to the basestation to be more accurate, which enables more precise link adaptation to be performed.

The feedback information is received from each mobile terminal of the selected subset of mobile terminals 20 by the basestation 10 (step 4D), via the antenna 109, and receiver 107. The controller 101, and the resource allocation unit 103 then use the received feedback information to enable scheduling, link adaptation and other required transmit mode adaptation to be performed for the selected subset of mobile terminals 20 (step 4E). The actual amount of scheduling that needs to be performed at this stage is dependent upon the amount performed immediately after the selection of the mobile terminals in step 4a. If resources are fully allocated in step 4B, then no further scheduling is needed. Naturally, however, if scheduling at step 4B was not complete, then completion of the scheduling is needed at step 4E.

Transmission adaptation can include choosing transmission mode. For example, selection of transmission mode can include selecting modulation modes and coding rates, and/or selecting one or more modes from a group including a spatial diversity mode, a single stream mode, a multi-stream mode, and a beam-formed multi-stream mode, etc.

Following scheduling and transmission mode adaptation, data are transmitted (step 4F) from the basestation to the selected subset of mobile terminals using the allocated resources. The mobile terminals then receive the transmitted data (step 5C).

As mentioned above, the selection message sent to a mobile terminal 20 may include information defining the type of feedback information that is to be returned to the basestation. For example, either block level or frame level feedback information can be specified. As is known, frame level feedback needs fewer overhead than block level feedback.

For the mobile terminals with high mobility, frame level feedback information should preferably be chosen. For mobile terminals located at a cell edge that therefore cannot support a high enough bit rate for block-wise feedback, should also make use of frame level feedback information. If the resource allocation unit makes an allocation of resources to the mobile terminals following selection of the subset, then frame level feedback can be used in order to reduce further the feedback overhead.

For frame level feedback, the feedback information can be averaged across the selected mobile terminals which are to make use of frame level feedback. Accordingly, only a single feedback information transmission is required per user per frame. This greatly reduces the amount of feedback information being transmitted to the basestation.

If frequency-domain scheduling and adaptation is to be performed, then it is necessary to request block level feedback information from the selected mobile terminals. For example, if PFTF scheduling or block-wise precoding or beamforming is to be used, then block level feedback information is required.

By selecting a subset of the mobile terminals, the amount of feedback information being transmitted to the basestation is reduced from the amount in which mobile terminals continually transmit feedback information according to a predetermined schedule. In embodiments of the present invention, feedback information is only required from selected mobile terminals. In addition, determining the appropriate type of feedback information feedback mechanism allows the system to reduce further the amount of feedback information being transmitted.

It will be appreciated that the feedback information used for link adaptation and other transmit mode adaptations in embodiments of the present invention can be provided by any quality measure appropriate for the radio link concerned. For example, channel state information (CSI), channel quality indicator information (CQI), transmission weights or beam selection indicator can be utilised.

The techniques described with reference to downlink data transmission are applicable to uplink transmissions, albeit with some differences, as described below.

The basestation 10 still makes the selection decision regarding the mobile terminals, following receipt of respective transmission requests from the mobile terminals. The selection message includes information regarding which mobile terminals should transmit its pilot transmission signal and probably the additional information of the bands for pilot transmissions. The basestation receives the pilot signals, and then generates channel information equivalent to the feedback information discussed above. The control 101 and the resource allocation unit 103 use this channel information to schedule the transmissions, and to provide transmission adaptation information to the mobile terminals.

The techniques described above enable a wideband wireless telecommunications system to reduce the amount of bandwidth required in the uplink for transmission of feedback information from the mobile terminals to the basestation, whilst maintaining desirably high quality of timely feedback information. This high quality feedback information enables high quality transmission adaptation to be performed, thereby enabling high quality communications between the basestation and mobile terminals. The techniques are applicable to any system in which common resources are shared by mobile terminals. For example, multi-carrier CDMA systems, OFDMA systems, or HSDPA systems, can all benefit from the techniques embodying the present invention.

The invention claimed is:

1. A method of controlling link resources in a wireless telecommunications system, the link resources being provided by a basestation of the system for enabling communication from the basestation to a plurality of mobile terminals, the method comprising:
   selecting a subset of mobile terminals from the plurality of mobile terminals communicating with the basestation;
   pre-allocating link resources to the mobile terminals in the selected subset of mobile terminals;
   determining transmission weights for each of the mobile terminals in the subset of mobile terminals;
   sending respective selection messages to the mobile terminals in the subset of mobile terminals, each selection message including pre-allocation information for the mobile terminal concerned, and being transmitted in the form of a dedicated pilot signal using the determined transmission weights for the mobile terminal concerned;
   obtaining feedback information from the mobile terminals in the selected subset, such feedback information being supplied in response to reception of a selection message, the feedback information including channel interference information;
   performing transmission mode adaptation for the mobile terminals in the selected subset in dependence upon the obtained feedback information.

2. A method as claimed in claim 1, wherein the mobile terminals in the plurality of mobile terminals are actively waiting in a packet data reception mode.

3. A method as claimed in claim 1, wherein pre-allocating link resources includes pre-allocating transmission beams.

4. A method as claimed in claim 1, wherein selection of the subset of mobile terminals is made in dependence upon pre-determined selection criteria that include service characteristics, transmitter buffer size, transmission priority, and handover prediction.

5. A method as claimed in claim 1, wherein performing transmission mode adaptation includes selecting a transmission mode including modulation modes and coding rates for the selected mobile terminals.

6. A basestation for use in a wireless telecommunications system, the basestation comprising:
   a controller operable to select a subset of mobile terminals from a plurality of mobile terminals communicating with the basestation;
   a resource allocation unit operable to pre-allocate link resources to the mobile terminals in the selected subset of mobile terminals, and to determine transmission weights for each of the mobile terminals in the subset of mobile terminals;
   a transmitter, responsive to the resource avocation unit, and operable to send respective selection messages to the mobile terminals in the selected subset of mobile terminals, each selection message including pre-allocation information, and being transmitted in the form of a dedicated pilot signal using respective determined transmission weights for the mobile terminals concerned;

a receiver operable to obtain feedback information from mobile terminals in the selected subset, such feedback information being supplied in response to reception of such selection messages;

a resource allocation unit operable to perform transmission mode adaptation for the mobile terminals in the selected subset in dependence upon obtained feedback information.

7. A method of controlling uplink resources in a wireless telecommunications system, the uplink resources being provided by a basestation of the system for enabling communication from a plurality of mobile terminals and the basestation, the method comprising:

receiving respective transmission request messages from a plurality of mobile terminals;

selecting a subset of mobile terminals from the plurality of mobile terminals;

pre-allocating respective link resources to the mobile terminals in the subset of mobile terminals;

determining transmission weight information for each of the mobile terminals in the subset of mobile terminals;

sending respective selection messages to the mobile terminals in the subset of mobile terminals, each selection message including pre-allocation information and transmission weight information for the mobile terminal concerned;

obtaining feedback information relating to the mobile terminals in the selected subset, the feedback information including channel interference information;

performing transmission mode adaptation for the mobile terminals in the selected subset in dependence upon the obtained feedback information, wherein the feedback information is based upon pilot signals received from the mobile terminals of the selected subset of mobile terminals, said pilot signals being transmitted with the respective determined transmission weights.

8. A method as claimed in claim 7, further comprising transmitting transmission mode adaptation information to the mobile terminals concerned.

9. A method as claimed in claim 7, comprising performing resource allocation in dependence upon the obtained feedback information.

10. A method as claimed in claim 7, wherein selection of the subset of mobile terminals is made in dependence upon predetermined selection criteria.

11. A method as claimed in claim 7, wherein performing transmission mode adaptation includes selecting a transmission mode including modulation modes and coding rates for the selected mobile terminals.

12. A method as claimed in claim 7, wherein performing link adaptation includes allocating transmission power for the allocated link resources.

13. A method as claimed in claim 7, wherein performing link adaptation includes allocating transmission weights, or beams.

14. A basestation for use in a wireless telecommunications system, the basestation comprising:

a receiver operable to receive respective transmission request messages from a plurality of mobile terminals;

a controller operable to select a subset of mobile terminals from the plurality of mobile terminals, and to obtain feedback information relating to the mobile terminals in the selected subset, and to perform transmission mode adaptation for the mobile terminals in the selected subset in dependence upon the obtained feedback information; and a resource allocation unit operable to:

pre-allocate respective link resources to the mobile terminals in the subset of mobile terminals;

determine transmission weight information for each of the mobile terminals in the subset of mobile terminals; and send respective selection messages to the mobile terminals in the subset of mobile terminals, each selection message including pre-allocation information and transmission weight information for the mobile terminal concerned, wherein said receiver is further operable to receive pilot signals from the mobile terminals of the selected subset of mobile terminals, said pilot signals being transmitted with the respective determined transmission weights.

* * * * *